(12) United States Patent
Patil et al.

(10) Patent No.: US 12,319,868 B2
(45) Date of Patent: Jun. 3, 2025

(54) METHODS OF MAKING AND USING A THIXOTROPIC CEMENT COMPOSITION

(71) Applicant: Halliburton Energy Services, Inc., Houston, TX (US)

(72) Inventors: Sandip Prabhakar Patil, Pune (IN); Malharrao Hambirrao Jadhav, Pune (IN); Ganesh Shriniwas Pangu, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 47 days.

(21) Appl. No.: 17/702,002

(22) Filed: Mar. 23, 2022

(65) Prior Publication Data
US 2023/0303906 A1  Sep. 28, 2023

(51) Int. Cl.
| | |
|---|---|
| *C09K 8/506* | (2006.01) |
| *C04B 14/06* | (2006.01) |
| *C04B 14/10* | (2006.01) |
| *C04B 24/10* | (2006.01) |
| *C04B 28/02* | (2006.01) |
| *C09K 8/504* | (2006.01) |
| *E21B 21/00* | (2006.01) |
| *E21B 33/13* | (2006.01) |
| *E21B 47/00* | (2012.01) |
| *C04B 103/00* | (2006.01) |

(52) U.S. Cl.
CPC .............. *C09K 8/506* (2013.01); *C04B 14/06* (2013.01); *C04B 14/10* (2013.01); *C04B 24/10* (2013.01); *C04B 28/02* (2013.01); *C09K 8/5045* (2013.01); *E21B 21/003* (2013.01); *E21B 33/13* (2013.01); *E21B 47/00* (2013.01); *C04B 2103/0079* (2013.01)

(58) Field of Classification Search
CPC ..................................................... E21B 33/138
See application file for complete search history.

(56) References Cited

U.S. PATENT DOCUMENTS

| | | | | |
|---|---|---|---|---|
| 4,515,216 | A | * | 5/1985 | Childs ................... C09K 8/487 |
| | | | | 106/803 |
| 7,435,293 | B2 | | 10/2008 | Caveny et al. |
| 8,685,903 | B2 | | 4/2014 | Ravi et al. |
| 10,344,544 | B2 | * | 7/2019 | Ravi ....................... C09K 8/487 |
| 10,415,330 | B2 | | 9/2019 | Shine, Jr. |
| 2007/0125539 | A1 | | 6/2007 | Caveny et al. |
| 2011/0220349 | A1 | | 9/2011 | Dakin |
| 2012/0192768 | A1 | * | 8/2012 | Ravi ........................ C09K 8/40 |
| | | | | 106/793 |
| 2021/0071062 | A1 | | 3/2021 | Ruiz et al. |

FOREIGN PATENT DOCUMENTS

| | | |
|---|---|---|
| CN | 109180879 A | 1/2019 |
| WO | 2011154699 A1 | 12/2011 |

OTHER PUBLICATIONS

National Library of Medicine, Carboxymethyl cellulose compound summary, 2005 (Year: 2005).*
Foreign Communication from Related Application—International Search Report and Written Opinion of the International Searching Authority, International Application No. PCT/US2022/022273, dated Dec. 8, 2022, 11 pages.

* cited by examiner

*Primary Examiner* — William D Hutton, Jr.
*Assistant Examiner* — Avi T Skaist
(74) *Attorney, Agent, or Firm* — Conley Rose, P.C.; Rodney B. Carroll

(57) ABSTRACT

Disclosed herein is a method of servicing a wellbore penetrating a subterranean formation with a thixotropic cement composition. The thixotropic cement composition comprises a cementitious material, maltodextrin, and an aqueous fluid, has a 10-minute gel strength of from about 30 lbf/100 ft$^2$ to about 300 lbf/100 ft$^2$, and can be used to reduce lost circulation in the wellbore. By incorporating maltodextrin into the thixotropic cement composition as disclosed herein, the thixotropic cement composition can have a similar 10-minute gel strength and an increased thickening time when compared to a reference composition.

20 Claims, No Drawings

METHODS OF MAKING AND USING A THIXOTROPIC CEMENT COMPOSITION

FIELD

This application relates to a composition, and more specifically this application relates to a thixotropic cement composition that can be used in the recovery of natural resources from a wellbore penetrating a subterranean formation.

BACKGROUND

This disclosure relates generally to a method of treating a wellbore penetrating a subterranean formation. More specifically, it relates to methods of making and using a thixotropic cement composition for treating a wellbore penetrating a subterranean formation, for example treating a lost circulation zone in the wellbore.

Hydrocarbons, such as oil and gas, residing in a subterranean formation or zone are usually recovered by drilling a wellbore down to the subterranean formation while circulating a drilling fluid in the wellbore. The drilling fluid is usually circulated downward through the interior of the drill pipe and upward through the annulus, which is located between the exterior of the drill pipe and the interior wall of the wellbore. It is well known that wellbores pass through a number of zones within a subterranean formation other than the particular hydrocarbon zones of interest. In various scenarios, fluid in a wellbore may communicate with fluid in the subterranean formation around the wellbore. In one scenario, fluids used in servicing a wellbore (e.g., a drilling fluid) may be lost to the subterranean formation while circulating the fluids in the wellbore. In particular, the fluids may enter the subterranean formation via lost circulation zones, for example, depleted zones, zones of relatively low pressure, zones having naturally occurring fractures, weak zones having fracture gradients exceeded by the hydrostatic pressure of the wellbore servicing fluid (e.g., a drilling fluid), and so forth. As a result, the service provided by such wellbore servicing fluid is more difficult to achieve. A composition with fluid loss control property can be introduced in the above scenarios to reduce and eventually prevent the undesired fluid communication between the wellbore and the subterranean formation surrounding the wellbore. To be more effective, the composition should ideally be thixotropic, which can maintain a low viscosity while under shear, but when allowed to remain static, the wellbore servicing fluid should develop gel strength quickly with the ability to thin and flow when shear is re-applied. Rapid development of compressive strength is also desired after placement into the lost circulation zone.

Therefore, an ongoing need exists for a composition with fluid loss control property and be thixotropic.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

This disclosure involves a thixotropic cement composition that can be used as a lost circulation fluid (also referred to as a fluid loss control fluid), which can reduce or prevent undesired fluid communication between a wellbore and subterranean formation surrounding the wellbore. The methods disclosed herein involves making and using this thixotropic cement composition for servicing a wellbore penetrating a subterranean formation, more specifically, for using this thixotropic cement composition as a lost circulation fluid.

Being thixotropic means having a property of thixotropy, which is a time-dependent shear thinning property. When a stress is applied (being shaken, agitated, sheared, pumped, or otherwise stressed) to a thixotropic fluid (e.g., the thixotropic cement composition), viscosity of the thixotropic fluid decreases and the thixotropic fluid becomes thin and less viscous over time; after the stress stops, viscosity of the thixotropic fluid increases and it will take a finite time for the thixotropic fluid to return to a viscous state. In some embodiments, the thixotropic cement composition is effectively thixotropic to be pumped downhole, and upon cessation of the pumping the thixotropic cement composition exhibits increasing gel strength to set.

The thixotropic cement composition can comprise a cementitious material, maltodextrin, and an aqueous fluid. As referred to herein, the term "maltodextrin" will be understood as a white hygroscopic powdered carbohydrate, which may be derived from maize starch. Maltodextrin has been assigned CAS Number 9050-36-6. A suitable source of maltodextrin is commercially available from Sigma-Aldrich Co. and can be obtained with varying dextrose equivalents of 4.0-7.07, 13-17, and 16.5-19.5. Another suitable source of maltodextrin is commercially available from Main Street Ingredients, La Crosse, Wisconsin, under the trade name "SPLENDA."

Among other things, the presence of maltodextrin in the thixotropic cement composition of the present disclosure may retard the setting time of the thixotropic cement composition of the present disclosure. In some embodiments, the maltodextrin, inter alia, may retard the setting time of the thixotropic cement composition while accelerating early compressive strength development. In certain embodiments, the thixotropic cement composition of the present disclosure comprising maltodextrin ultimately may develop compressive strength that exceeds the compressive strength that a reference composition ultimately would develop, wherein the reference composition does not include maltodextrin and is otherwise identical to the thixotropic cement composition. In some embodiments, the presence of maltodextrin in the thixotropic cement composition may contribute to a viscosity appropriate for discouraging any flow of fluids into the formation.

Generally, maltodextrin can be present in the thixotropic cement composition of the present disclosure in an amount sufficient to retard the setting of the thixotropic cement composition of the present disclosure for a desired time. The amount of maltodextrin that may be included may depend on a number of factors, including, but not limited to, the bottom hole circulating temperature of the well into which the thixotropic cement composition is to be placed, the particular formulation of the chosen maltodextrin (e.g., the particular dextrose equivalent of the chosen maltodextrin), and the like. In some embodiments, the quantity of the maltodextrin to be included in the thixotropic cement composition may be determined prior to preparation of the thixotropic cement composition. For example, the quantity of the maltodextrin to be included in the thixotropic cement composition may be determined by performing thickening time tests of the type described in API-RP-10B-2. More particularly, in certain embodiments, the maltodextrin may be present in the thixotropic cement composition of the present disclosure in an amount in the range of from about 0.1 wt. % to about 5 wt. %, based on the total weight of the thixotropic cement composition, alternatively from about 0.1 wt. % to about 4 wt. %, alternatively from about 0.1 wt. % to about 3 wt. %, alternatively from about 0.1 wt. % to about 2 wt. %, or alternatively from about 0.1 wt. % to about 1 wt. %.

In embodiments, the thixotropic cementitious composition comprises a cementitious material. The cementitious material can comprise calcium, aluminum, silicon, oxygen, iron, and/or sulfur. The cementitious material can comprise Portland cement, pozzolana cement, gypsum cement, shale cement, acid/base cement, phosphate cement, high alumina content cement, slag cement, silica cement, high alkalinity cement, magnesia cement, or combinations thereof. In embodiments, "high alumina content cement" refers to a cement having an alumina concentration in the range of from about 40 wt. % to about 80 wt. % by a weight of the high alumina content cement. In embodiments, "high alkalinity cement" refers to a cement having a sodium oxide concentration in the range of from about 1.0 wt. % to about 2.0 wt. % by a weight of the high alkalinity cement.

Portland cements that are suited for use in the disclosed thixotropic cementitious composition include, but are not limited to, Class A, C, G, H, low sulfate resistant cements, medium sulfate resistant cements, high sulfate resistant cements, or combinations thereof. The class A, C, G, and H cements are classified according to API Specification 10. Additional examples of Portland cements suitable for use in the present disclose include, without limitation, those classified as ASTM Type I, II, III, IV, or V. In embodiments, the cementitious material comprises a Class G cement, a Class H cement, a Class A cement, a Class C cement, or combinations thereof.

The cementitious material can be present in the thixotropic cementitious composition in an amount of from about 0.01 wt. % to about 85 wt. % based on the total weight of the thixotropic cementitious composition, alternatively from about 0.01 wt. % to about 75 wt. %, alternatively from about 0.01 wt. % to about 50 wt. %, or alternatively from about 0.04 wt. % to about 25 wt. %.

The thixotropic cement composition can include an aqueous fluid. Generally, the aqueous fluid may be from any source, provided that it does not contain an amount of components that may undesirably affect the other components (e.g., maltodextrin, the cementitious material) in the thixotropic cement composition. For example, the aqueous fluid can comprise fresh water, surface water, ground water, produced water, salt water, sea water, brine (e.g., underground natural brine, formulated brine, etc.) or a combination thereof. In some embodiments, the aqueous fluid includes a brine. In one or more embodiments, the brine includes monovalent or divalent salts such as, sodium chloride, sodium bromide, potassium bromide, potassium chloride, magnesium chloride, calcium chloride, calcium bromide, potassium formate, cesium formate, lithium chloride, lithium bromide, sodium formate, lithium formate, ammonium chloride, tetramethyl ammonium chloride, choline chloride, potassium acetate, or a combination thereof. A formulated brine may be produced by dissolving one or more soluble salts in water, a natural brine, or sea water. The brine can be saturated or unsaturated.

The aqueous fluid can be present in the thixotropic cement composition in an amount effective to provide a pumpable slurry, such as a slurry having desired (e.g., job or service specific) rheological properties. In embodiments, the aqueous fluid is present in the thixotropic cement composition in an amount of from about 5 vol. % to about 99 vol. % based on the total volume of the thixotropic cement composition, alternatively from about 10 vol. % to about 99 vol. %, or alternatively from about 25 vol. % to about 95 vol. %.

In embodiments, the thixotropic cement composition further comprises amorphous silica. Among other things, the amorphous silica may impart viscosity to the thixotropic cement composition. In general, amorphous silica is a high surface area, non-crystalline form of silica. An example of a suitable amorphous silica is Silicalite™ cement additive, available from Halliburton Energy Services, Inc. The amorphous silica may be present in the thixotropic cement composition in an amount of from about 0.001 wt. % to about 50 wt. % based on the total weight of the thixotropic cement composition, alternatively from about 0.01 wt. % to about 50 wt. %, alternatively from about 0.01 wt. % to about 40 wt. %, alternatively from about 0.01 wt. % to about 30 wt. %, or alternatively from about 0.1 wt. % to about 20 wt. %. One of ordinary skill in the art, with the benefit of this disclosure, will recognize the appropriate amount of the amorphous silica to include for a chosen application.

In embodiments, the thixotropic cement composition further comprises a clay. The clay can comprise sepiolite, montmorillonite, beidellite, nontronite, samonite, smectite, kaolinite, serpentine, illite, chlorite, saponite, fuller's earth, attapulgite, or combinations thereof.

The clay can be present in the thixotropic cement composition in an amount of from about 0.001 wt. % to about 15 wt. % based on the total weight of the thixotropic cement composition, alternatively from about 0.01 wt. % to about 12 wt. %, or alternatively from about 0.1 wt. % to about 10 wt. %.

In embodiments, the thixotropic cement composition further comprises a viscosifier. The viscosifier can comprise a biopolymer, a synthetic polymer, or a combination thereof. In some embodiments, the viscosifier comprises hydroxyethyl cellulose, hydroxy-propyl guar, carboxy-methyl-hydroxy-propyl guar, modified polysaccharides, partially hydrolyzed polyacrylamide (PHPA), carboxy-methylcellulose, polyanionic cellulose, guar gum, locust bean gum, Karaya gum, gum tragacanth, hydrophobically modified guars, high-molecular weight polysaccharides composed of mannose and galactose sugars, heteropolysaccharides obtained by the fermentation of starch-derived sugars, xanthan, pectins, diutan, welan, gellan, scleroglucan, chitosan, dextran, substituted or unsubstituted galactomannans, starch, cellulose, cellulose ethers, carboxycelluloses, hydroxypropyl cellulose, carboxyalkylhydroxyethyl celluloses, carboxymethyl hydroxyethyl cellulose, methyl cellulose, sodium polyacrylate, polyacrylamide, partially hydrolyzed polyacrylamide, polymethacrylamide, poly(acrylamido-2-methyl-propane sulfonate), poly(sodium-2-acrylamide-3-propylsulfonate), copolymers of acrylamide and acrylamido-2-methyl-propane sulfonate, terpolymers of acrylamido-2-methyl-propane sulfonate, acrylamide and vinylpyrrolidone or itaconic acid, or combinations thereof.

In embodiments, the viscosifier has a number average molecular weight in a range of from about 1.2 MM Dalton (Da) to about 5 MM Da, alternatively from about 1.5 MM Da to about 4.5 MM Da, or alternatively from about 2 MM Da to about 4 MM Da.

In some embodiments, the viscosifier is in the thixotropic cement composition in an amount of from about 0.001 wt. % to about 10 wt. %, based on the total weight of the thixotropic cement composition, alternatively from about 0.01 wt. % to about 5 wt. %, or alternatively from about 0.1 wt. % to about 2 wt. %.

In embodiments, the thixotropic cement composition further comprises one or more additives. The one or more additives can comprise weighting agents, retarders, accelerators, activators, gas control additives, lightweight additives, gas-generating additives, mechanical-property-enhancing additives, lost-circulation materials, filtration-control additives, fluid-loss-control additives, defoaming agents, foaming agents, transition time modifiers, thixotropic additives, suspending agents, or combinations thereof. The oxidative breaker can include bromate, persulfate, perborate, and perbromate, for example. With the benefit of this disclosure, one of ordinary skill in the art should be able to recognize and select one or more suitable additives for use in the thixotropic cement composition.

In embodiments, the one or more additives are present in the thixotropic cement composition in an amount of from about 0.001 wt. % to about 75 wt. %, based on the total weight of the thixotropic cement composition, alternatively from about 0.1 wt. % to about 70 wt. %, or alternatively from about 1 wt. % to about 50 wt. %.

Rheology results of the thixotropic cement composition can be measured. Viscosity of the thixotropic cement composition can be converted from "rheology dial readings," which herein refers to dial readings on a Fann® viscometer at different rotational speeds (e.g., 300 revolutions per minute (rpm) to 3 rpm), when measured in accordance with test standard API-RP-10B-2. For example, the Fann® viscometer is rotated at 300 rpm for 10 seconds and a value on the dial is read, the speed can then be changed to another rpm and a new value on the dial reading can be taken. There are a number of theoretical models known to those of ordinary skill in the art that can be used to convert the values from the dial readings at the different rpm's into viscosity (centipoises).

In embodiments, at a speed of from about 3 rpm to about 300 rpm and atmospheric pressure, the thixotropic cement composition has a rheology dial reading in a range of from about 3 to about 300, alternatively from about 3 to about 200, alternatively from about 5 to about 200, alternatively from about 5 to about 100, alternatively from about 5 to about 80, or alternatively from about 10 to about 50, when measured in accordance with test standard API-RP-101B-2. In some embodiments, at a speed of about 3 rpm, and atmospheric pressure, the thixotropic cement composition has a rheology dial reading in a range of from about 3 to about 50, alternatively from about 3 to about 40, alternatively from about 5 to about 40, or alternatively from about 10 to about 35, when measured in accordance with test standard API-RP-103-2. In an aspect, the rheology dial readings described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the rheology dial readings described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

The thixotropic cement composition can have a 10-second gel strength of from about 5 lbf/100 ft$^2$ to about 100 lbf/100 ft$^2$, alternatively from about 5 lbf/100 ft$^2$ to about 85 lbf/100 ft$^2$, alternatively from about 5 lbf/100 ft$^2$ to about 75 lbf/100 ft$^2$, alternatively from about 15 lbf/100 ft$^2$ to about 75 lbf/100 ft$^2$, or alternatively from about 15 lbf/100 ft$^2$ to about 65 lbf/100 ft$^2$, when measured in accordance with test standard API-RP-10B-2. The thixotropic cement composition can have a 10-minute gel strength of from about 30 lbf/100 ft$^2$ to about 300 lbf/100 ft$^2$, alternatively from about 30 lbf/100 ft$^2$ to about 250 lbf/100 ft$^2$, alternatively from about 50 lbf/100 ft$^2$ to about 220 lbf/100 ft$^2$, alternatively from about 70 lbf/100 ft$^2$ to about 220 lbf/100 ft$^2$, or alternatively from about 100 lbf/100 ft$^2$ to about 200 lbf/100 ft$^2$, when measured in accordance with test standard API-RP-10B-2. In some embodiments, the thixotropic cement composition has a 10-minute gel strength of equal to or greater than about 50% of a 10-minute gel strength of a reference composition, alternatively equal to or greater than about 60%, alternatively equal to or greater than about 70%, or alternatively equal to or greater than about 80%, when measured in accordance with test standard API-RP-10B-2, wherein the reference composition does not include maltodextrin and is otherwise identical to the thixotropic cement composition. In some embodiments, the thixotropic cement composition has a 10-minute gel strength and a 10-second gel strength, wherein the 10-minute gel strength at the temperature is greater than twice of the 10-second gel strength at the temperature, alternatively greater than 2.5 times, alternatively greater than 3 times, or alternatively greater than 4 times of the 10-second gel strength at the temperature, when measured in accordance with test standard API-RP-10B-2. In an aspect, the 10-second gel strength and/or the 10-minute gel strength described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the 10-second gel strength and/or the 10-minute gel strength described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

In embodiments, the thixotropic cement composition has a thickening time. The thickening time herein refers to the time required for the thixotropic cement composition to achieve 70 Bearden units of Consistency (Be) after preparation of the thixotropic cement composition. At about 70 Bc, the thixotropic cement composition undergoes a conversion from a pumpable fluid state to a non-pumpable gel. In order to keep the thixotropic cement composition in a pumpable state for an appropriate amount of time, additives such as retarders and accelerators can be added to modulate the pump time by shortening or extending the thickening time. A measurement of Be can be considered a thickening time test which is performed on a moving fluid. In a thickening time test, an apparatus including a pressurized consistometer can apply temperature and pressure to a slurry (e.g., the thixotropic cement composition) while the slurry is being stirred by a paddle. A resistor arm and potentiometer coupled to the paddle can provide an output in units of Be. Thickening time can be measured in accordance with test standard API-RP-10B-2.

In embodiments, at about 3,000 psi, the thixotropic cement composition has a thickening time to achieve about 70 Be ranging from about 2 hours to about 15 hours, alternatively from about 2 hours to about 12 hours, alternatively from about 3 hours to about 12 hours, alternatively from about 4 hours to about 12 hours, or alternatively from about 5 hours to about 12 hours, when measured in accordance with test standard API-RP-10B-2. In embodiments, at about 3,000 psi, the thixotropic cement composition has an increase in thickening time to achieve about 70 Be and a decrease in 10-minute gel strength when compared to a reference composition, wherein the reference composition does not include maltodextrin and is otherwise identical to the thixotropic cement composition and wherein the increase can be equal to or greater than about 30% and the decrease can be equal to or less than about 50%, alternatively, the increase is equal to or greater than about 40% and the decrease is equal to or less than about 40%, alternatively, the increase is equal to or greater than about 50% and the decrease is equal to or less than about 30%, alternatively, the increase is equal to or greater than about 70% and the decrease is equal to or less than about 30%, or alternatively, the increase is equal to or greater than about 100% and the decrease is equal to or less than about 30; and wherein the thickening time to about 70 Be and the 10-minute gel strength of the thixotropic cement composition and the reference composition can be measured in accordance with test standard API-RP-10B-2. In an aspect, the thickening time described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the thickening time described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

Compressive strength is generally the capacity of a material or structure to withstand axially directed compression forces. The compressive strength of a composition can be measured at a specified time (e.g., 24 hours) after a cement blend has been mixed with water and the resultant cement slurry is maintained under specified temperature and pressure conditions to form a hardened, set cement. For example, compressive strength can be measured at a time in the range of from about 12 to about 48 hours (or longer) after the cement slurry is mixed, and the cement slurry is maintained typically at a temperature of from 0° C./32° F. to about 204° C./400° F. and a suitable pressure, during which time the cement slurry can set into a hardened mass. Compressive strength can be measured by either a destructive method or non-destructive method. The destructive method physically tests the strength of hardened samples at various points in time by crushing the samples in a compression-testing machine. The compressive strength is calculated from the failure load divided by the cross-sectional area resisting the load and is reported in units of pound-force per square inch (psi). Non-destructive methods can employ an ultrasonic cement analyzer (UCA). A UCA can be available from Fann® Instrument Company, Houston, TX. Compressive strengths can be determined in accordance with API RP 10B-2, Recommended Practice for Testing Well Cements, First Edition, July 2005. Sonic strength is a measure of compressive strength based on "transit time" of soundwaves through the cement. The sonic strength is an indicator of crush compressive strength and is often used to monitor compressive strength versus time.

The thixotropic cement composition may have a compressive strength evaluated by noting the time for the thixotropic cement composition to reach 100 psi compressive strength (also referred to as "time to reach 100 psi") as measured in an ultrasonic cement analyzer (UCA) test in accordance with test standard API-RP-10B-2. The time to reach 100 psi under static conditions in a UCA can be used as an estimation of the wait on cement time of a composition. At about 3,000 psi, the thixotropic cement composition has a time to reach 100 psi of from about 2 hours to about 25 hours, alternatively from about 2 hours to about 22 hours, alternatively from about 3 hours to about 22 hours, alternatively from about 4 hours to about 20 hours, alternatively from about 4 hours to about 16 hours, alternatively from about 4 hours to about 12 hours, or alternatively from about 5 hours to about 12 hours, when measured in a UCA in accordance with test standard API-RP-10B-2. In embodiments, the thixotropic cement composition has a 24-hour compressive strength (also referred to as "24-hour crush strength" or "24-hour crush compressive strength") measured in accordance with test standard API-RP-10B-2. The time is 24-hour period after preparation of the thixotropic cement composition. At about 3,000 psi, the 24-hour compressive strength can be in a range of from about 50 psi to about 1,000 psi, alternatively from about 50 psi to about 900 psi, alternatively from about 100 psi to about 900 psi, alternatively from about 200 psi to about 900 psi, or alternatively from about 300 psi to about 800 psi, when measured in a UCA in accordance with test standard API-RP-10B-2. In an aspect, the time to reach 100 psi compressive strength and/or the 24-hour compressive strength described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the time to reach 100 psi compressive strength and/or the 24-hour compressive strength described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

Plastic viscosity is the viscosity when extrapolated to infinite shear rate, e.g., the slope of the shear stress/shear rate line above yield point. The yield point refers to the resistance of a fluid to initial flow, or represents the stress required to start fluid movement. The thixotropic cement composition disclosed herein can have any suitable plastic viscosity and yield point. At pressures ranging from about atmospheric to about 40,000 psi, the thixotropic cement composition can have a plastic viscosity of from about 20 cP to about 400 cP, alternatively from about 20 cP to about 380 cP, or alternatively from about 20 cP to about 350 cP. At pressures ranging from about atmospheric to about 40,000 psi, the thixotropic cement composition can have a yield point of from about 1 lbf/100 ft$^2$ to about 100 lbf/100 ft$^2$, alternatively from about 2 lbf/100 ft$^2$ to about 90 lbf/100 ft$^2$, alternatively from about 3 lbf/100 ft$^2$ to about 80 lbf/100 ft$^2$, or alternatively from about 5 lbf/100 ft$^2$ to about 70 lbf/100 ft$^2$. The plastic viscosity and yield point can be calculated using Bingham Plastic model. In an aspect, the plastic viscosity and/or the yield point described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the plastic viscosity and/or yield point described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

For a given composition density and/or operating temperature (e.g., a range of bottomhole circulating temperatures associated with a given wellbore service), concentration of the various components of the thixotropic cement composition can be varied within the ranges disclosed herein to provide one or more of the parameters selected from (i) a rheology dial reading meeting the values disclosed herein, (ii) a 10-second gel strength meeting the values disclosed herein, (iii) a 10-minute gel strength meeting the values disclosed herein, (iv) a thickening time meeting the values disclosed herein, (v) a 100 psi compressive strength meeting the values disclosed herein, (vi) a 24-hour compressive strength meeting the values disclosed herein, (vii) a plastic viscosity meeting the values disclosed herein, (viii) a yield point meeting the values disclosed herein, or (ix) any combination of (i) to (viii).

In embodiments, the thixotropic cement composition is used for servicing a wellbore penetrating a subterranean formation. The wellbore can have a Bottomhole Circulating Temperature (BHCT) of from about 30° F. to about 500° F., alternatively from about 50° F. to about 500° F., alternatively from about 50° F. to about 450° F., alternatively from about 50° F. to about 400° F., alternatively from about 80° F. to about 250° F., alternatively from about 50° F. to about 200° F., alternatively from about 80° F. to about 200° F., or alternatively from about 80° F. to about 190° F. In embodiments, the wellbore has a Bottomhole Static Temperature (BHST) of from about 30° F. to about 500° F., alternatively from about 50° F. to about 500° F., alternatively from about 50° F. to about 450° F., alternatively from about 50° F. to about 400° F., alternatively from about 80° F. to about 250° F., alternatively from about 50° F. to about 200° F., alternatively from about 80° F. to about 200° F., or alternatively from about 80° F. to about 190° F.

The thixotropic cement composition disclosed herein can have any suitable density. In some embodiments, the density of the thixotropic cement composition ranges from about 7 pounds per gallon (lb/gal) to about 25 lb/gal, alternatively from about 8 lb/gal to about 23 lb/gal, alternatively from about 9 lb/gal to about 22 lb/gal, or alternatively from about 10 lb/gal to about 22 lb/gal.

A thixotropic cement composition of the type disclosed herein can be prepared using any suitable method, such as batch mixing or continuous mixing. In one or more embodiments, the method comprises mixing components (e.g., the aqueous fluid, maltodextrin, and the cementitious material) of the thixotropic cement composition using mixing equipment (e.g., a jet mixer, re-circulating mixer, a batch mixer, a blender, a mixing head of a solid feeding system) to form a pumpable fluid. For example, all components of the thixotropic cement composition may be added to a batch mixer and agitated until the desired amount of mixing is achieved. Alternatively, the thixotropic cement composition may be added to a continuous mixer where components are metered into the mixer and a product of the thixotropic cement composition is continuously withdrawn.

After preparation, if the thixotropic cement composition is transported to and/or stored at the wellsite, the transportation and/or storage vessel can have an agitator, rotor, mixer, or the like to impart sufficient shear to the thixotropic cement composition to maintain a flowable, pumpable composition (e.g., a slurry).

Also disclosed herein is a method of servicing a wellbore penetrating a subterranean formation. The method can comprise introducing a thixotropic cement composition of the type disclosed herein proximate the location of a lost circulation zone in the wellbore. As previously mentioned, lost circulation zones are often encountered in a wellbore. A lost circulation zone can comprise a depleted zone, a zone of relatively low pressure, a zone having naturally occurring fractures, a weak zone having fracture gradients exceeded by the hydrostatic pressure of the drilling fluid, or combinations thereof. The lost circulation zone can be in an uncased portion of the wellbore, such as a zone having naturally occurring fractures. The lost circulation zone can comprise flow paths between the wellbore and the subterranean formation, where fluids can flow from the wellbore to the subterranean formation or in a reverse direction.

Service provided by a wellbore servicing fluid in the lost circulation zone can be more difficult to achieve. In one scenario, a drilling fluid may be lost to the formation, resulting in the circulation of the drilling fluid in the wellbore being too low to allow for further drilling of the wellbore. The thixotropic cement composition can be used to seal the lost circulation zones to prevent the uncontrolled flow of fluids into or out of the lost circulation zones, e.g., lost drilling fluid circulation, crossflows, underground blowouts and the like.

In other scenarios, a secondary cement/sealant composition may be lost to the formation as it is being placed in the wellbore, thereby rendering the secondary operation ineffective in maintaining isolation of the formation. In addition to drilling fluids, embodiments of the present disclosure may also be used to control lost circulation problems encountered with other fluids, for example, spacer fluids, completion fluids (e.g., completion brines), fracturing fluids, and cement compositions that may be placed into a well bore.

In some embodiments, a method of servicing a wellbore penetrating a subterranean formation comprises: drilling the wellbore with a drill bit connected to a drill pipe, determining a location of a lost circulation zone in the wellbore, and introducing a thixotropic cement composition of the type disclosed herein proximate the location of the lost circulation zone. Drilling the wellbore can comprise circulating a drilling fluid via the drill pipe. In some embodiments, the lost circulation zone is in an uncased portion of the wellbore.

In embodiments, introducing the thixotropic cement composition comprises pumping the thixotropic cement composition into the wellbore. The thixotropic cement composition can be pumped through one or more openings at the end of the string of the drill pipe. In some embodiments, the thixotropic cement composition is pumped through the drill pipe and the drill bit.

The method can further comprise allowing the thixotropic cement composition to flow into at least a portion of the lost circulation zone. Once placed into the lost circulation zone, the thixotropic cement composition can be allowed to set, thus a hardened mass (i.e., the set thixotropic cement composition) can be formed inside the lost circulation zone. In some embodiments, the set thixotropic cement composition blocks at least a portion of the lost circulation zone, for example, by forming plugs in flow paths in the lost circulation zone. The set thixotropic cement composition can reduce lost circulation by reducing or preventing flow of the drilling fluid from the wellbore through the lost circulation zone and into the adjacent subterranean formation, which allows for continued drilling. In embodiments, the method further comprises ceasing introducing the thixotropic cement composition before allowing the thixotropic cement composition to set. Upon cessation of introducing the thixotropic cement composition (e.g., pumping), the thixotropic cement composition can exhibit increasing gel strength to set.

In some embodiments, the drilling is discontinued prior to introducing the thixotropic cement composition proximate the location of the lost circulation zone. In such embodiments, the method can further comprise resuming drilling of the wellbore after allowing the thixotropic cement slurry to set.

In some embodiments, a method of servicing a wellbore penetrating a subterranean formation comprises: drilling the wellbore with a drill bit connected to a drill pipe; determining a location of a lost circulation zone in the wellbore, wherein the lost circulation zone is in an uncased portion of the wellbore; introducing, via the drill pipe, a thixotropic cement composition of the type disclosed herein proximate the location of the lost circulation zone; allowing the thixotropic cement composition to flow into at least a portion of the lost circulation zone; ceasing introducing the thixotropic cement composition; and allowing the thixotropic cement composition to set.

In some embodiments, the drilling is discontinued prior to introducing the thixotropic cement composition proximate the location of the lost circulation zone. The set thixotropic cement composition can reduce lost circulation by reducing or preventing flow of a drilling fluid from the wellbore through the lost circulation zone and into the adjacent subterranean formation. In embodiments, the method further comprises resuming drilling of the wellbore after allowing the thixotropic cement slurry to set.

Various benefits may be realized by utilization of the presently disclosed methods and compositions. By incorporating maltodextrin into the thixotropic cement composition as disclosed herein, the thixotropic cement composition can have a similar 10-minute gel strength and an increased thickening time when compared to a reference composition.

With the properties in rheology, gel strength, thickening time, etc., the thixotropic cement composition can be used to reduce lost circulation in a wellbore.

Example

The embodiments having been generally described, the following example is given as particular embodiments of the disclosure and to demonstrate the practice and advantages thereof. It is understood that the example is given by way of illustration and is not intended to limit the specification or the claims in any manner.

Rheology dial reading, gel strength, thickening time to achieve 70 Bc, time to reach 100 psi, and 24-hour compressive strength of four cement compositions were measured in accordance with test standard API-RP-10B-2. The four cement compositions, designated as slurry 1 through slurry 4 in Table 1, were prepared per API procedure. Slurry 2 was a thixotropic cement composition of the type disclosed herein, Slurry 1 was a reference composition that did not include maltodextrin and was otherwise identical to Slurry 2, and Slurries 3 and 4 included a commercially available cement retarder instead of maltodextrin. A Fann® viscometer equipped with a Fann® Yield Stress Adapter (FYSA) was used in the measurement of rheology dial reading and gel strength.

TABLE 1

| Cement slurries at 12 lb/gal | | | | |
|---|---|---|---|---|
| Components | Slurry 1 | Slurry 2 | Slurry 3 | Slurry 4 |
| Cementitious material (g) | 100.0 | 100.0 | 100.0 | 100.0 |
| Viscosifier (g) | 0.32 | 0.32 | 0.32 | 0.32 |
| Amorphous silica (g) | 12.45 | 12.45 | 12.45 | 12.45 |
| Clay (g) | 2.24 | 2.24 | 2.24 | 2.24 |
| Water (g) | 137.2 | 137.2 | 137.2 | 137.2 |
| Defoamer (g) | 0.2 | 0.2 | 0.2 | 0.2 |
| Maltodextrin (g) | — | 0.5 | — | — |
| Cement retarder (g) | — | — | 0.5 | 0.25 |

Table 2 shows a summary of the results. Compared to rheology dial reading of Slurry 1, at each same rpm, the decrease in rheology dial reading of Slurry 2 was equal to or less than 15%, while the decrease in rheology dial reading of Slurry 3 and Slurry 4, respectively, was greater than 20%.

By adding maltodextrin to Slurry 1 to form Slurry 2, the 10-minute gel strength decreased by less than 10% (from 160 lbf/100 ft$^2$ to 145 lbf/100 ft$^2$), while the thickening time to 70 Bc increased by greater than 200% (from 2 hours and 47 minutes to 5 hours and 58 minutes). As a comparison, by adding a current cement retarder instead of maltodextrin to Slurry 1 to form Slurry 4, the thickening time to 70 Bc increased by similar percentage, but the 10-minute gel strength decreased by over 60% (from 160 lbf/100 ft$^2$ to 56 lbf/100 ft$^2$). Slurry 3 contained a greater amount of the current cement retarder than Slurry 4, and had a greater thickening time increase as well as a greater 10-minute gel strength decrease. The time to reach 100 psi of Slurry 2 and Slurry 4 were similar (e.g., less than 10% difference), and 24-hour compressive strength of the four cement compositions were similar.

The results indicate that by incorporating maltodextrin, the thixotropic cement composition of the type disclosed herein (Slurry 2) could maintain a similar 10-minute gel strength as the reference composition (Slurry 1) while increasing the thickening time by greater than 30%.

TABLE 2

Summary of results

| Parameters | Slurry 1 | Slurry 2 | Slurry 3 | Slurry 4 |
|---|---|---|---|---|
| Rheology dial reading and Gel Strength on FYSA at 190° F. | | | | |
| 300 rpm | 36 | 33 | 26 | 28 |
| 200 rpm | 32 | 29 | 22 | 25 |
| 100 rpm | 28 | 27 | 18 | 21 |
| 6 rpm | 27 | 24 | 13 | 17 |
| 3 rpm | 26 | 23 | 12 | 16 |
| 10-second gel strength (lbf/100 ft$^2$) | 50 | 31 | 14 | 21 |
| 10-minute gel strength (lbf/100 ft$^2$) | 160 | 145 | 32 | 56 |
| Thickening Time (70 Bc) at 190° F./3,000 psi, (hr:min) | 02:47 | 05:58 | 16:38 | 06:21 |
| Strength in UCA at 210° F./3,000 psi | | | | |
| Time to reach 100 psi (hr:min) | 3:41 | 07:05 | 12:34 | 06:51 |
| 24-hour compressive strength (psi) | 404 | 414 | 396 | 407 |

Additional Disclosure

The following is provided as additional disclosure for combinations of features and embodiments of the present disclosure.

A first embodiment, which is a method of servicing a wellbore penetrating a subterranean formation, comprising: introducing a thixotropic cement composition proximate a location of a lost circulation zone, wherein the thixotropic cement composition comprises a cementitious material, maltodextrin, and an aqueous fluid, and wherein the thixotropic cement composition has a 10-minute gel strength of from about 30 lbf/100 ft$^2$ to about 300 lbf/100 ft$^2$, when measured in accordance with test standard API-RP-10B-2; allowing the thixotropic cement composition to flow into at least a portion of the lost circulation zone; and allowing the thixotropic cement composition to set. In an aspect, the 10-minute gel strength described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the 10-minute gel strength described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

A second embodiment, which is the method of the first embodiment, further comprising drilling the wellbore with a drill bit connected to a drill pipe and determining the location of the lost circulation zone in the wellbore, prior to introducing the thixotropic cement composition proximate the location of the lost circulation zone, wherein drilling the wellbore comprises circulating a drilling fluid via the drill pipe.

A third embodiment, which is the method of the second embodiment, wherein the drilling is discontinued prior to introducing the thixotropic cement composition proximate the location of the lost circulation zone and further comprising resuming drilling of the wellbore after allowing the thixotropic cement slurry to set.

A fourth embodiment, which is the method of any of the first through the third embodiments, wherein the lost circulation zone is in an uncased portion of the wellbore.

A fifth embodiment, which is the method of any of the first through the fourth embodiments, wherein introducing the thixotropic cement composition comprises pumping the thixotropic cement composition into the wellbore.

A sixth embodiment, which is the method of the fifth embodiment, wherein the thixotropic cement composition is pumped into the wellbore via a drill pipe and a drill bit.

A seventh embodiment, which is the method of any of the first through the sixth embodiments, further comprising ceasing introducing the thixotropic cement composition before allowing the thixotropic cement composition to set.

An eighth embodiment, which is the method of any of the first through the seventh embodiments, wherein the set thixotropic cement composition blocks at least a portion of the lost circulation zone.

A ninth embodiment, which is the method of any of the first through the eighth embodiments, wherein the set thixotropic cement composition reduces lost circulation by reducing or preventing flow of a drilling fluid from the wellbore through the lost circulation zone and into the adjacent subterranean formation.

A tenth embodiment, which is the method of any of the first through the ninth embodiments, wherein maltodextrin is present in the thixotropic cement composition in an amount of from about 0.1 wt. % to about 5 wt. %, based on the total weight of the thixotropic cement composition.

An eleventh embodiment, which is the method of any of the first through the tenth embodiments, wherein the cementitious material comprises Portland cement, pozzolana cement, gypsum cement, shale cement, acid/base cement, phosphate cement, high alumina content cement, slag cement, silica cement, high alkalinity cement, magnesia cement, or combinations thereof.

A twelfth embodiment, which is the method of any of the first through the eleventh embodiments, wherein the cementitious material comprises a Class G cement, a Class H cement, a Class A cement, a Class C cement, or combinations thereof.

A thirteenth embodiment, which is the method of any of the first through the twelfth embodiments, wherein the cementitious material is present in the thixotropic cement composition in an amount of from about 0.01 wt. % to about 85 wt. % based on the total weight of the thixotropic cement composition.

A fourteenth embodiment, which is the method of any of the first through the thirteenth embodiments, wherein the aqueous fluid comprises water selected from the group consisting of fresh water, surface water, ground water, salt water, brine, sea water, produced water, and any combination thereof.

A fifteenth embodiment, which is the method of any of the first through the fourteenth embodiments, wherein the aqueous fluid is present in the thixotropic cement composition in an amount of from about 5 wt. % to about 99 wt. % based on the total weight of the thixotropic cement composition.

A sixteenth embodiment, which is the method of any of the first through the fifteenth embodiments, wherein the thixotropic cement composition further comprises amorphous silica.

A seventeenth embodiment, which is the method of the sixteenth embodiment, wherein the amorphous silica is present in the thixotropic cement composition in an amount of from about 0.001 wt. % to about 50 wt. % based on the total weight of the thixotropic cement composition.

An eighteenth embodiment, which is the method of any of the first through the seventeenth embodiments, wherein the thixotropic cement composition further comprises a clay.

A nineteenth embodiment, which is the method of the eighteenth embodiment, wherein the clay comprises sepiolite, montmorillonite, beidellite, nontronite, samonite, smectite, kaolinite, serpentine, illite, chlorite, saponite, fuller's earth, attapulgite, or combinations thereof.

A twentieth embodiment, which is the method of the eighteenth or the nineteenth embodiment, wherein the clay is present in the thixotropic cement composition in an amount of from about 0.001 wt. % to about 15 wt. % based on the total weight of the thixotropic cement composition.

A twenty-first embodiment, which is the method of any of the first through the twentieth embodiments, wherein the thixotropic cement composition further comprises a viscosifier.

A twenty-second embodiment, which is the method of the twenty-first embodiment, wherein the viscosifier comprises a biopolymer, a synthetic polymer, or a combination thereof.

A twenty-third embodiment, which is the method of the twenty-first or the twenty-second embodiment, wherein the viscosifier comprises hydroxyethyl cellulose, hydroxy-propyl guar, carboxy-methyl-hydroxy-propyl guar, modified polysaccharides, partially hydrolyzed polyacrylamide (PHPA), carboxy-methylcellulose, polyanionic cellulose, guar gum, locust bean gum, Karaya gum, gum tragacanth, hydrophobically modified guars, high-molecular weight polysaccharides composed of mannose and galactose sugars, heteropolysaccharides obtained by the fermentation of starch-derived sugars, xanthan, pectins, diutan, welan, gellan, scleroglucan, chitosan, dextran, substituted or unsubstituted galactomannans, starch, cellulose, cellulose ethers, carboxycelluloses, hydroxypropyl cellulose, carboxyalkyl-hydroxyethyl celluloses, carboxymethyl hydroxyethyl cellulose, methyl cellulose, sodium polyacrylate, polyacrylamide, partially hydrolyzed polyacrylamide, polymethacrylamide, poly(acrylamido-2-methyl-propane sulfonate), poly(sodium-2-acrylamide-3-propylsulfonate), copolymers of acrylamide and acrylamido-2-methyl-propane sulfonate, terpolymers of acrylamido-2-methyl-propane sulfonate, acrylamide and vinylpyrrolidone or itaconic acid, or combinations thereof.

A twenty-fourth embodiment, which is the method of any of the twenty-first through the twenty-third embodiments, wherein the viscosifier is present in the thixotropic cement composition in an amount of from about 0.001 wt. % to about 10 wt. % based on the total weight of the thixotropic cement composition.

A twenty-fifth embodiment, which is the method of any of the first through the twenty-fourth embodiments, wherein the thixotropic cement composition further comprises one or more additives.

A twenty-sixth embodiment, which is the method of the twenty-fifth embodiment, wherein the one or more additives comprise weighting agents, retarders, accelerators, activators, gas control additives, lightweight additives, gas-generating additives, mechanical-property-enhancing additives, lost-circulation materials, filtration-control additives, fluid-loss-control additives, defoaming agents, foaming agents, transition time modifiers, thixotropic additives, suspending agents, or combinations thereof.

A twenty-seventh embodiment, which is the method of the twenty-fifth or the twenty-sixth embodiment, wherein the one or more additives is present in the thixotropic cement composition in an amount of from about 0.001 wt. % to about 75 wt. % based on the total weight of the thixotropic cement composition.

A twenty-eighth embodiment, which is the method of any of the first through the twenty-seventh embodiments, wherein at atmospheric pressure and 3 rpm to 300 rpm, the thixotropic cement composition has a rheology dial reading in a range of from about 3 to about 300 when measured in accordance with test standard API-RP-10B-2. In an aspect, the rheology dial readings described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the rheology dial readings described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

A twenty-ninth embodiment, which is the method of any of the first through the twenty-eighth embodiments, wherein at atmospheric pressure and 3 rpm, the thixotropic cement composition has a rheology dial reading in a range of from about 3 to about 50 when measured in accordance with test standard API-RP-10B-2. In an aspect, the rheology dial readings described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the rheology dial readings described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

A thirtieth embodiment, which is the method of any of the first through the twenty-ninth embodiments, wherein the thixotropic cement composition has a 10-second gel strength of from about 5 lbf/100 ft$^2$ to about 100 lbf/100 ft$^2$ at F, when measured in accordance with test standard API-RP-10B-2. In an aspect, the 10-second gel strength described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the 10-second gel strength described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

A thirty-first embodiment, which is the method of any of the first through the thirtieth embodiments, wherein the thixotropic cement composition has a 10-minute gel strength of equal to or greater than about 50% of a 10-minute gel strength of a reference composition, when measured in accordance with test standard API-RP-10B-2, wherein the reference composition does not include maltodextrin and is otherwise identical to the thixotropic cement composition. In an aspect, the 10-minute gel strength described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the 10-minute gel strength described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

A thirty-second embodiment, which is the method of any of the first through the thirty-first embodiments, wherein the thixotropic cement composition has a 10-minute gel strength and a 10-second gel strength, wherein the 10-minute gel strength at the temperature is greater than twice of the 10-second gel strength at the temperature, when measured in accordance with test standard API-RP-10B-2. In an aspect, the 10-second gel strength and/or the 10-minute gel strength described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the 10-second gel strength and/or the 10-minute gel strength described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

A thirty-third embodiment, which is the method of any of the first through the thirty-second embodiments, wherein the thixotropic cement composition has a thickening time to achieve about 70 Bearden units of Consistency (Be) in a range of about 2 hours to about 15 hours at about 3,000 psi, when measured in accordance with test standard API-RP-10B-2. In an aspect, the thickening time described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the thickening time described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

A thirty-fourth embodiment, which is the method of any of the first through the thirty-third embodiments, wherein the thixotropic cement composition has an increase in thickening time to achieve about 70 Be and a decrease in 10-minute gel strength when compared to a reference composition, when measured in accordance with test standard API-RP-10B-2, wherein the increase is equal to or greater than about 30% and the decrease is equal to or less than about 50%, wherein the thickening time to about 70 Be is at about 3,000 psi, and wherein the reference composition does not include maltodextrin and is otherwise identical to the thixotropic cement composition. In an aspect, the thickening time described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the thickening time described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F. In an aspect, the 10-minute gel strength described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the 10-minute gel strength described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

A thirty-fifth embodiment, which is the method of any of the first through the thirty-fourth embodiments, wherein the thixotropic cement composition has a time to reach 100 psi in a range of about 2 hours to about 25 hours at about 3,000 psi, when measured in accordance with test standard API-RP-10B-2. In an aspect, the time to reach 100 psi compressive strength described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the time to reach 100 psi compressive strength described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

A thirty-sixth embodiment, which is the method of any of the first through the thirty-fifth embodiments, wherein the thixotropic cement composition has a 24-hour compressive strength in a range of about 50 psi to about 1,000 psi at about 3,000 psi, when measured in accordance with test standard API-RP-10B-2. In an aspect, the 24-hour compressive strength described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the 24-hour compressive strength described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

A thirty-seventh embodiment, which is the method of any of the first through the thirty-sixth embodiments, wherein the wellbore has a Bottomhole Circulating Temperature (BHCT) of from about 50° F. to about 500° F.

A thirty-eighth embodiment, which is the method of any of the first through the thirty-seventh embodiments, wherein the wellbore has a Bottomhole Static Temperature (BHST) of from about 50° F. to about 500° F.

A thirty-ninth embodiment, which is the method of any of the first through the thirty-eighth embodiments, wherein at 80° F. to 500° F. and 40,000 psi the thixotropic cement composition has a plastic viscosity of from about 20 cP to about 400 cP. In an aspect, the plastic viscosity described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the plastic viscosity described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

A fortieth embodiment, which is the method of any of the first through the thirty-ninth embodiments, wherein at 80° F. to 500° F. and 40,000 psi the thixotropic cement composition has a yield point of from about 1 lbf/100 ft$^2$ to about 100 lbf/100 ft$^2$. In an aspect, the yield point described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the yield point described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

A forty-first embodiment, which is the method of any of the first through the fortieth embodiments, wherein the thixotropic cement composition has a density of from about 7 pounds per gallon (lb/gal) to about 25 lb/gal.

A forty-second embodiment, which is a method of preparing the thixotropic cement composition of any of the first through the forty-first embodiments, comprising: mixing components of the thixotropic cement composition using mixing equipment to form a pumpable fluid.

A forty-third embodiment, which is a method of servicing a wellbore penetrating a subterranean formation, comprising: drilling the wellbore with a drill bit connected to a drill pipe; determining a location of a lost circulation zone in the wellbore, wherein the lost circulation zone is in an uncased portion of the wellbore; introducing, via the drill pipe, a thixotropic cement composition proximate the location of the lost circulation zone, wherein the thixotropic cement composition comprises a cementitious material, maltodextrin, and an aqueous fluid, and wherein the thixotropic cement composition has a 10-minute gel strength of from about 30 lbf/100 ft$^2$ to about 300 lbf/100 ft$^2$, when measured in accordance with test standard API-RP-10B-2; allowing the thixotropic cement composition to flow into at least a portion of the lost circulation zone; ceasing introducing the thixotropic cement composition; and allowing the thixotropic cement composition to set. In an aspect, the 10-minute gel strength described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In an aspect, the 10-minute gel strength described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

A forty-fourth embodiment, which is the method of the forty-third embodiment, wherein the drilling is discontinued prior to introducing the thixotropic cement composition proximate the location of the lost circulation zone, wherein the set thixotropic cement composition reduces lost circulation by reducing or preventing flow of a drilling fluid from the wellbore through the lost circulation zone and into the adjacent subterranean formation, and further comprising resuming drilling of the wellbore after allowing the thixotropic cement slurry to set.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A method of servicing a wellbore penetrating a subterranean formation, comprising:
    introducing a thixotropic cement composition proximate a location of a lost circulation zone,
    wherein the thixotropic cement composition comprises a cementitious material, maltodextrin, a viscosifier and an aqueous fluid,
    wherein maltodextrin is present in the thixotropic cement composition in an amount of from about 0.5 wt. % to about 5 wt. %, based on the total weight of the thixotropic cement composition,
    wherein the thixotropic cement composition has a density in a range of from about 7 to about 13 pounds per gallon, and
    wherein the thixotropic cement composition has a 10-minute gel strength of from about 60 lbf/100 ft$^2$ to about 300 lbf/100 ft$^2$;
    allowing the thixotropic cement composition to flow into at least a portion of the lost circulation zone; and
    allowing the thixotropic cement composition to set.

2. The method of claim 1, further comprising drilling the wellbore with a drill bit connected to a drill pipe and determining the location of the lost circulation zone in the wellbore, prior to introducing the thixotropic cement composition proximate the location of the lost circulation zone, wherein drilling the wellbore comprises circulating a drilling fluid via the drill pipe.

3. The method of claim 1, wherein introducing the thixotropic cement composition comprises pumping the thixotropic cement composition into the wellbore via a drill pipe and a drill bit.

4. The method of claim 1, wherein the set thixotropic cement composition reduces lost circulation by reducing or preventing flow of a drilling fluid from the wellbore through the lost circulation zone and into the adjacent subterranean formation.

5. The method of claim 1, wherein at atmospheric pressure and 3 rpm to 300 rpm, the thixotropic cement composition has a rheology dial reading in a range of from about 3 to about 300.

6. The method of claim 1, wherein at atmospheric pressure and 3 rpm, the thixotropic cement composition has a rheology dial reading in a range of from about 3 to about 50.

7. The method of claim 1, wherein the thixotropic cement composition has a 10-second gel strength of from about 5 lbf/100 ft$^2$ to about 100 lbf/100 ft$^2$.

8. The method of claim 1, wherein the thixotropic cement composition has a 10-minute gel strength of equal to or greater than about 50% of a 10-minute gel strength of a reference composition, wherein the reference composition does not include maltodextrin and is otherwise identical to the thixotropic cement composition.

9. The method of claim 1, wherein the thixotropic cement composition has a 10-minute gel strength and a 10-second gel strength, wherein the 10-minute gel strength at the temperature is greater than twice of the 10-second gel strength at the temperature.

10. The method of claim 1, wherein the thixotropic cement composition has a thickening time to about 70 Bearden units of Consistency (Bc) in a range of about 2 hours to about 15 hours at about 3,000 psi.

11. The method of claim 1, wherein the thixotropic cement composition has an increase in thickening time to achieve about 70 Bc and a decrease in 10-minute gel strength when compared to a reference composition, wherein the increase is equal to or greater than about 30% and the decrease is equal to or less than about 50%, wherein the thickening time to achieve about 70 Bc is at about 3,000 psi, and wherein the reference composition does not include maltodextrin and is otherwise identical to the thixotropic cement composition.

12. The method of claim 1, wherein the thixotropic cement composition further comprises a clay.

13. The method of claim 1, wherein the wellbore has a bottom hole circulating temperature of from about 50° F. to about 300° F.

14. The method of claim 1, wherein the viscosifier has a number average molecular weight of from about 1.2 MM Da to about 5 MM Da.

15. The method of claim 1, wherein at a cement composition density of about 12 pounds per gallon the 10-minute gel strength has decreased by equal to or less than about 10% when compared to the 10-minute gel strength of the thixotropic cement composition lacking maltodextrin.

16. The method of claim 1, wherein the thixotropic cement composition has a density in a range of from about 10 to about 13 pounds per gallon.

17. A method of servicing a wellbore penetrating a subterranean formation, comprising:
    introducing a thixotropic cement composition proximate a location of a lost circulation zone,
    wherein the thixotropic cement composition consists essentially of a cementitious material, maltodextrin, an amorphous silica, a clay, a viscosifier, and an aqueous fluid,
    wherein maltodextrin is present in the thixotropic cement composition in an amount of from about 0.5 wt. % to about 5 wt. %, based on the total weight of the thixotropic cement composition,
    wherein the thixotropic cement composition has a 10-minute gel strength of from about 60 lbf/100 ft$^2$ to about 300 lbf/100 ft$^2$, and
    wherein the thixotropic cement composition has a density in a range of from about 7 to about 13 pounds per gallon;
    allowing the thixotropic cement composition to flow into at least a portion of the lost circulation zone; and
    allowing the thixotropic cement composition to set.

18. The method of claim 17, wherein the clay comprises sepiolite.

19. The method of claim 18, wherein the viscosifier comprises diutan.

20. The method of claim 17, wherein the thixotropic cement composition has a density in a range of from about 10 to about 13 pounds per gallon.

* * * * *